June 14, 1966 J. M. EASTMAN 3,255,583
FLUID VECTORING CONTROL MEANS
Filed June 18, 1962 5 Sheets-Sheet 2
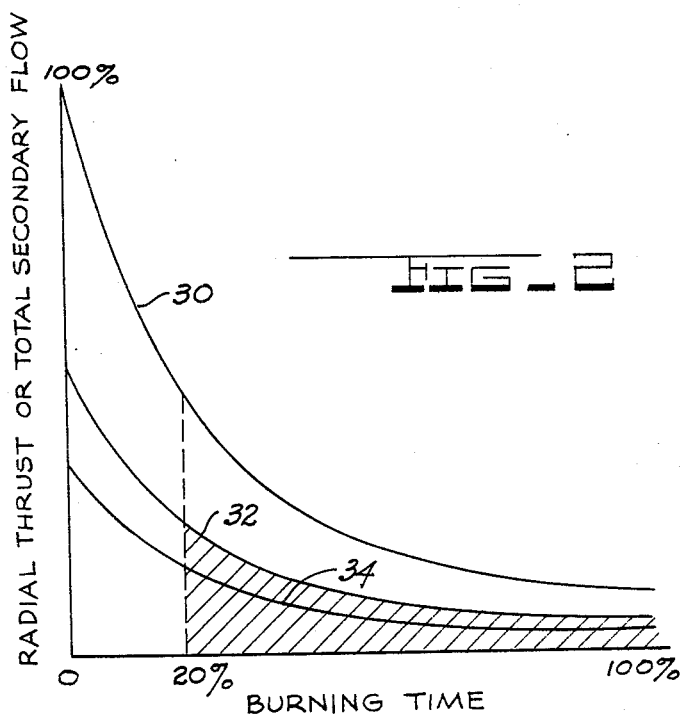
FIG_2
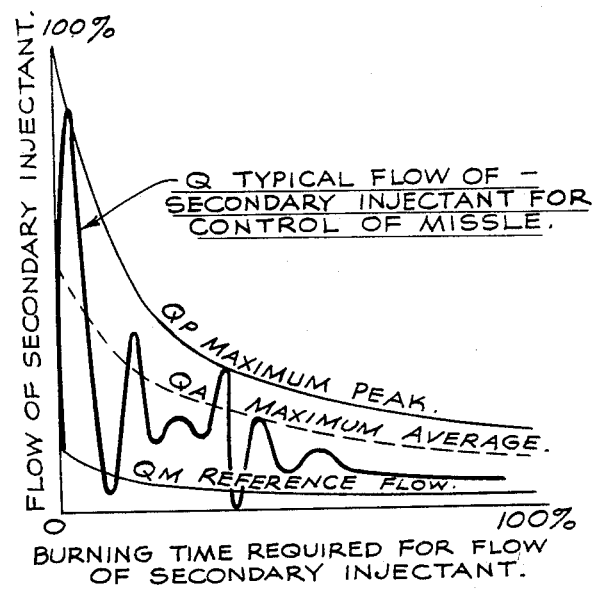
FIG_2A
INVENTOR.
JAMES M. EASTMAN.
BY
ATTORNEY.

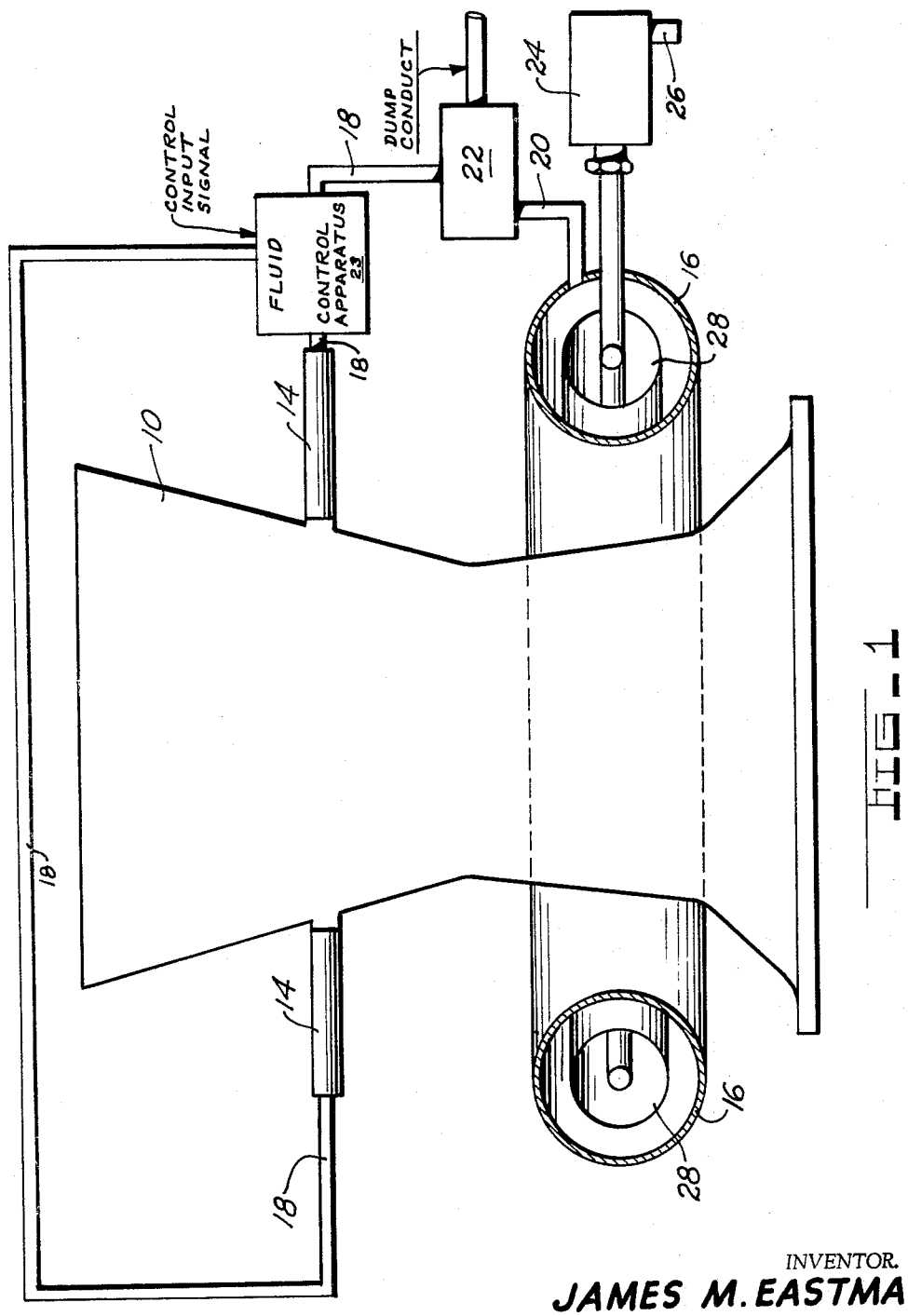

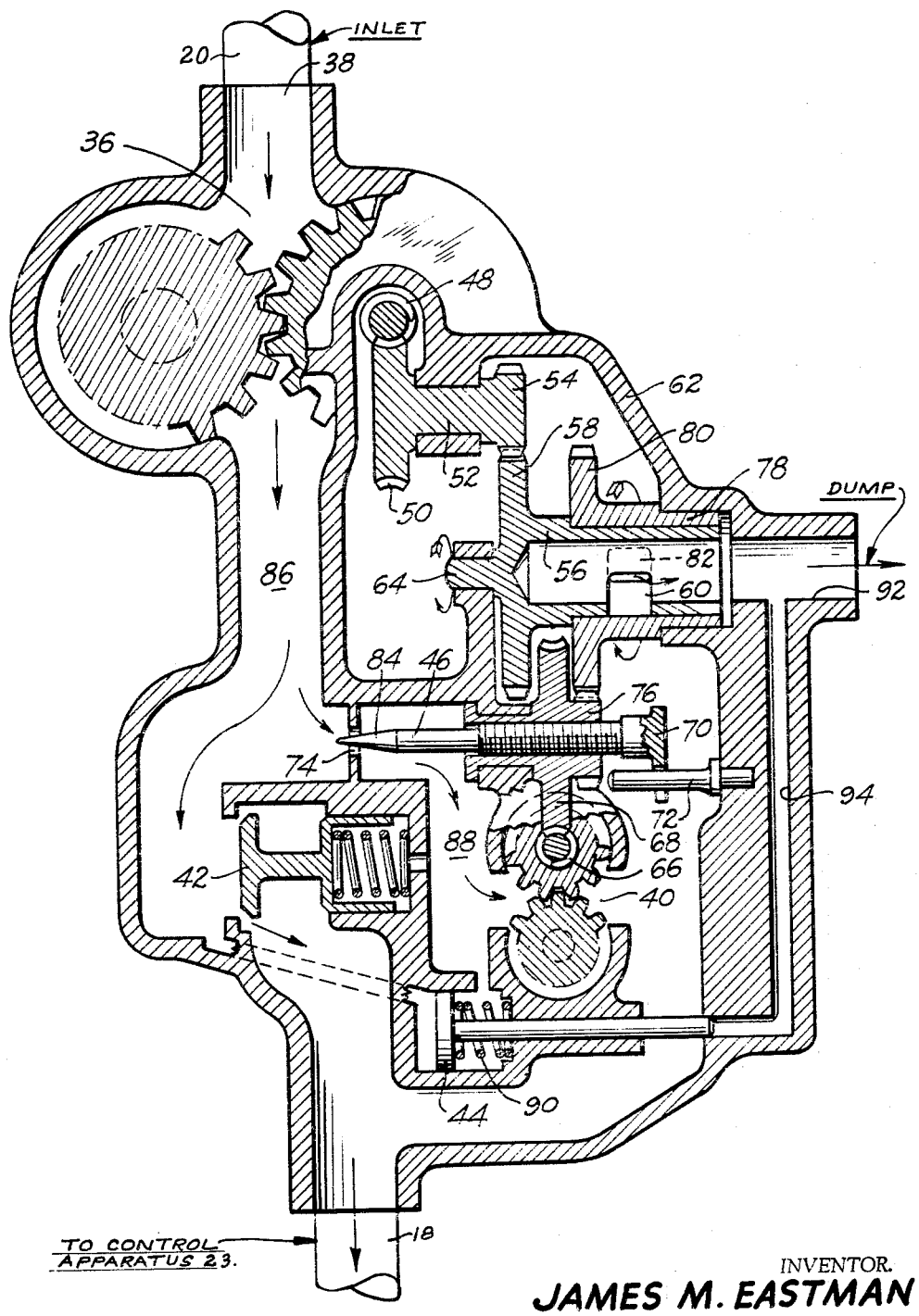

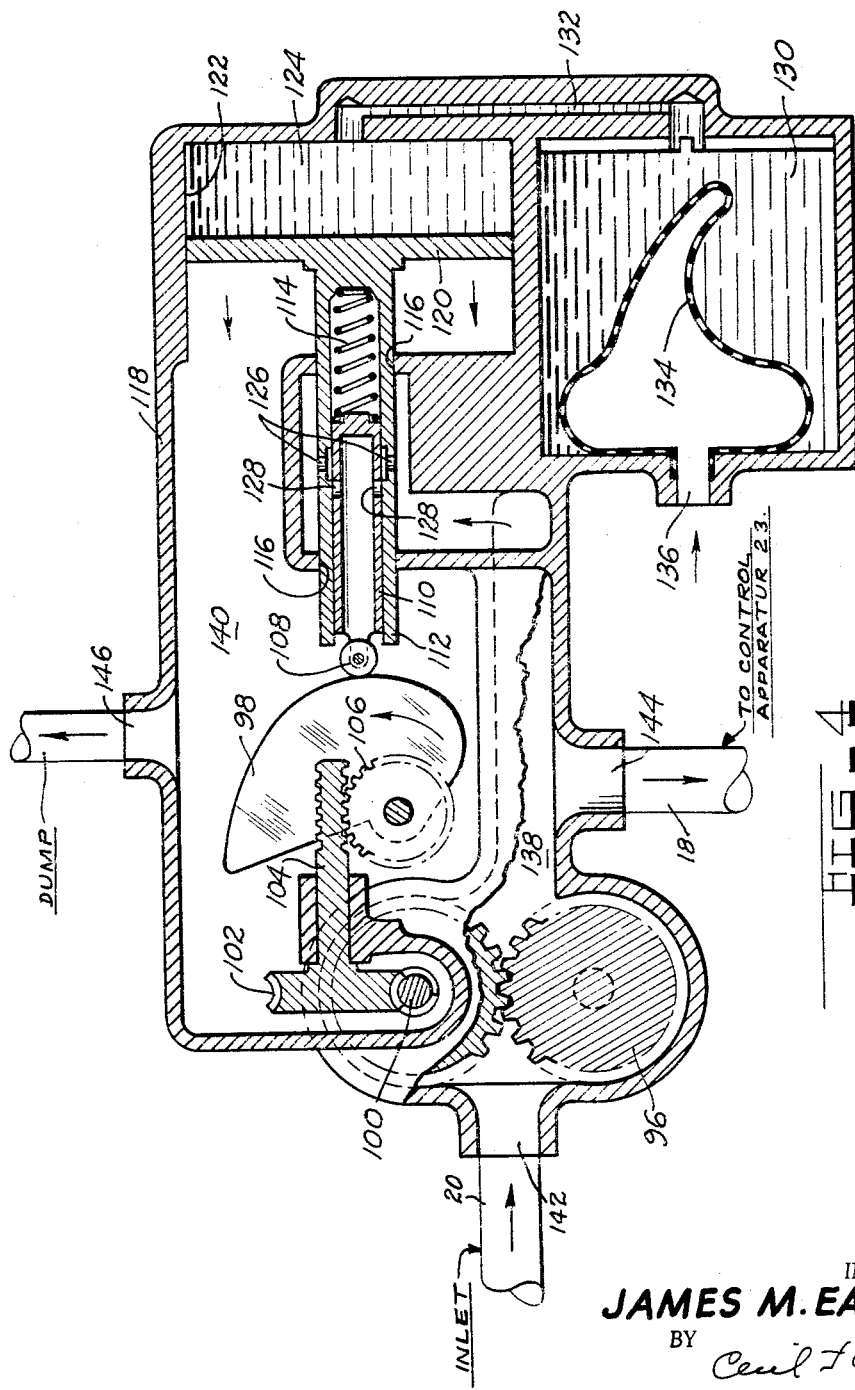

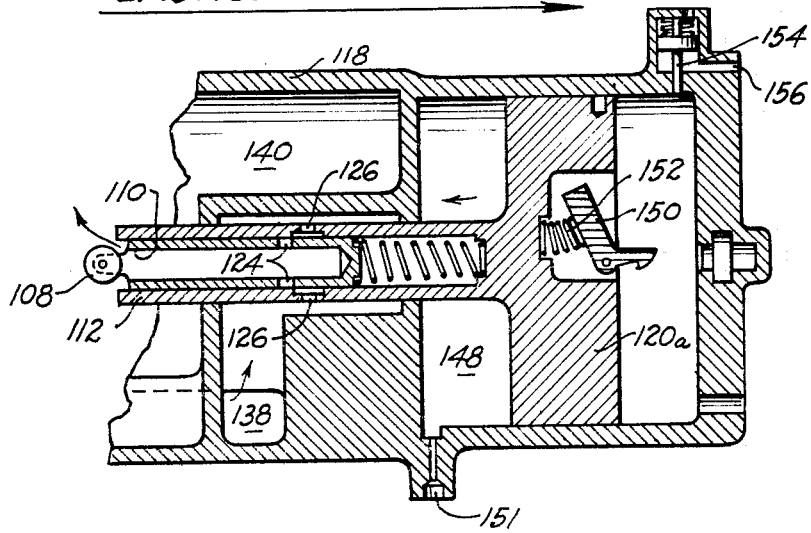
FIG_5
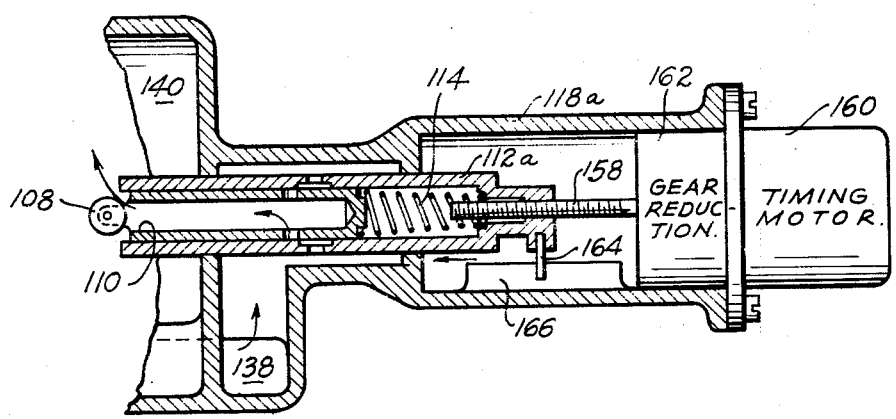
FIG_6

United States Patent Office 3,255,583
Patented June 14, 1966

3,255,583
FLUID VECTORING CONTROL MEANS
James M. Eastman, South Bend, Ind., assignor to The Bendix Corporation, South Bend, Ind., a corporation of Delaware
Filed June 18, 1962, Ser. No. 203,299
18 Claims. (Cl. 60—35.54)

This invention relates to a means for controlling a fluid supply in accordance with a demand thereon. More particularly, this invention is concerned with relating a fluid flow to a fluid demand to insure the requiste amount of fluid is available over a known time span, but with essentially no excess fluid.

One particular application, but not limiting, for this invention is in controlling the amount of fluid available for secondary injection systems such as may be used in controlling a missile or the like. With such systems there is a need for only so much fluid as is necessary for control of the missile. Any more than this means excess weight which seriously affects the range of any associated missile. With such applications, I have found that my valve decreases the net chargeable weight attributed to the secondary injection fluid. For example, any balance of secondary injection fluid which is not utilized or exhausted is chargeable at its full weight (depending on vehicle parameters) whereas fluid which is injected is only chargeable at a small fraction of its weight. If 20% of the fluid remains at the end of burning, and if injected fluid is charged at 10% of its weight, the net chargeable fluid weight is nearly three times as high as if the fluid were all used up. If means are provided for continuously getting rid of fluid at a programmed rate, whether used for steering or not, excessive quantities of fluid at the end of burning can be avoided. It can be seen that the net chargeable fluid weight is very sensitive to the percent of liquid remaining. In particular, if 4% of fluid instead of 2% remains and the expended fluid is charged at 10%, the net chargeable liquid weight is increased from 11.8% to 13.6%. That is, a ±1% tolerance on dumping precision results in approximately 15% total variation in fluid weight.

With this and other problems in mind, such as providing a bypass valve for controlling the supply of a fluid, it is a principal object of this invention to provide a valve which relates fluid flow to the fluid demand.

Another object of this invention is to integrate flow as a means of establishing when to bypass a fluid flow.

A further object of this invention is to correlate a fluid flow with a fluid pressure to bypass excess fluid.

An additional object of my invention is to bypass only the excessive fluid.

As may be readily appreciated those skilled in the art may find other objects and advantages of my invention from the following description and the accompanying drawings in which:

FIGURE 1 is a schematic of a rocket nozzle having a secondary injection system which provides one environment for which my invention is particularly suited;

FIGURES 2 and 2A are graphical representationss of the fluid requirements of such a secondary injection system as shown by FIGURE 1 which requirements are met by my valve;

FIGURE 3 is a sectional side view of one form of my valve showing a system using integrating flow meters;

FIGURE 4 is a sectional side view of another form which my valve may asume wherein flow and pressure are related to bypass non-required fluid;

FIGURE 5 is a sectional view of an alternate arrangement of movable member and cam follower assembly of FIGURE 4; and FIGURE 6 is a sectional view of another means of correlating the cam follower of FIGURE 4 with an electrical actual time sensor.

With reference to FIGURE 1, a rocket nozzle 10 is shown having secondary injection assemblies 14. These assemblies receive fluid from a tank 16 which tank is connected to the assemblies by an annular manifold 18, conduit 20 and a metering valve 22 interposed in the manifold conduit connection and designed in accordance with my invention. Conventional valving mechanism generally indicated by box 23 labeled "Fluid Control Apparatus" is responsive to a control input signal as will be readily understood by those persons skilled in the art and serves to divert the fluid discharged from metering valve 22 to one or both of the injection assemblies 14 to thereby modify the thrust vector of nozzle 10 accordingly.

In this particular application, the fluid contained by tank 16 causes the gases in nozzle 10 to be redirected to thereby afford a control component for any associated vehicle such as a missile. One such medium is Freon. However, I do not intend to be limited to such as Freon for other fluids such as air, nitrogen, water, etc. may also serve in some applications. If the fluid in tank 16 is a liquid (Freon, for example), a simple gas generator 24 with an ignitor 26 (shown in block form) may be provided to pressurize the liquid by expanding a bladder 28 within the tank 16. As may be appreciated by those skilled in the art other means of supplying a fluid to valve 22 may be utilized and the one shown and described above is only to be considered exemplary of many.

When considering the use of my control with such an engine as shown in FIGURE 1, it is necessary to insure an adequate amount of secondary injectant fluid on board throughout the propulsion time. The normal duty cycle for such engines requires a thrust vectoring requirement essentially as seen in FIGURE 2. This cycle is characterized by a maximum instantaneous capability for a secondary injection system represented by curve 30, which must always be available, as well as a maximum average duty (curve 32) and a probable average duty capability (curve 34). These curves illustrate how a thrust vectoring requirement drops off drastically after the first few seconds of firing.

If enough fluid is carried to meet the maximum average duty capability of curve 32, and the quantity used is as indicated by curve 34, then the area between these curves shows the quantity of fluid not needed. This fluid would be normally left at the end of burning and chargeable at its full weight. By programmed dumping of this excess fluid, the chargeable weight, as mentioned above, can be reduced. I have found that my valve can be utilized to continuously maintain a remaining balance of fluid aboard which would match the maximum average duty flow requirement for the remaining propulsion time. For example, after 20% of the burning time has elapsed, the cross-hatched area of FIGURE 2 shows the optimum amount of secondary fluid aboard. If fluid has been expended according to the most probable average duty curve, then it will have been necessary to dump fluid represented by the area between the maximum average and probable average duty curves up to the burning time elapsed such as the 20% burning time shown.

In FIGURE 2A, the maximum peak curve $Q_P$ corresponds to the maximum instantaneous capability curve 30 of FIGURE 2. Similarly, the maximum average duty curve $Q_A$ corresponds to curve 32 of FIGURE 2. The probable average duty curve 34 of FIGURE 2 is a smoothed or averaged version of the typical flow demand curve Q of FIGURE 2A.

With reference to FIGURE 3, there is presented one form which my valve 22 (as in FIGURE 1) may take. In detail, the valve includes a gear-type flow meter 36 adjacent the inlet 38 and another gear-type meter 40 as well as spring biased valves 42 and 44, plus a needle valve 46. In addition, the flow meter 36 is provided with a worm gear 48 which drives gear 50, shaft 52 and gear 54. Gear 54 is operatively connected to sleeve 56 through the gear 58. Sleeve 56 is slotted, as at 60, and is held by appropriate bearing means to the housing 62, as at 64. On the other hand, the flow meter 40 drives a worm gear 66 which worm drives gear 68. The gear 68 is mounted for rotation to the housing 62, and the gear is centrally bored and threaded to mount the needle valve 56, which needle valve contains a head 70 slotted for cooperation with a pin 72 extending from the housing 62 to guide the valve 46 and hold it so that rotation of gear 68 causes valve 46 to move towards the valve seat 74. The gear 68 also drives a gear 76 which gear 76 is operatively connected with a sleeve 78 through a gear 80. The sleeve 78 is slotted, as at 82.

In operation, the valve may be explained with reference to the application to the propulsion system of FIGURE 1 having a secondary injection requirement as presented in FIGURE 2A such that the flow relationship may be determined by:

$$Q_M = f(t) K Q_A$$

or $$\int_0^t (Q + Q_D) dt \geq \int_0^t \frac{Q_M}{k} dt = \int_0^t Q_A dt$$

where $Q$ = Flow demanded by the system;
$Q_A$ = Maximum preselected average flow;
$Q_D$ = Dumped flow;
$Q_M$ = Preselected reference flow;
$f(t)$ = A preselected function of time; and
$K$ = An arbitrary constant for obtaining a reference flow less than typical flow.

More particularly, the valve must function so that the total quantity removed from the tank 16 is always at least equal to the area under the maximum average curve up to the time instant in question. It is therefore my intent to have flow meter 36 measure the total quantity of fluid that has left tank 16, and to have flow meter 40 measure the quantity of flow through a reference system. The drive ratio of the gear train from flow meter 40 to sleeve 78 is designed to equal the drive ratio of the gear train from meter 36 to sleeve 56 such that sleeves 78 and 56 rotate together and in the same direction. The reference flow $Q_M$ through meter 40 is controlled as a function of time such that at any instant the net flow which has passed through is an arbitrary small fraction K times the net flow which would have flowed through meter 36 if this net flow had at all times equalled the design maximum average flow $Q_A$ in FIGURE 2A. The displacement of flow meter 40 is K times the displacement of the flow meter 36. Thus, if the flow through meter 36 does in fact always equal the design maximum average flow $Q_A$, the two flow meters will always turn at equal speed and the sleeves 56 and 78 will rotate in unison. If at any time the net quantity which has passed through meter 36 tends to be less than the area under the design $Q_A$ curve up to that instant, sleeve 56 lags behind sleeve 78 such that ports 82 and 60 overlap and fluid is dumped through port 92. This increases the flow through meter 36 so that the quantity which has passed through it is always at least equal to the area under the design $Q_A$ curve up to the instant in question.

The reference flow called for by curve $Q_M$ is established by providing a contoured tip 84 to the needle valve 46 and positioning it to regulate the orifice area between chamber 86 and chamber 88. The needle valve 46 and a bypass valve 42 connected in parallel with said needle valve passes the entire flow from tank 16. Valve 42 senses the pressure drop from chambers 86 to 88 and is spring biased, as shown, to regulate the pressure drop to a preselected value, so that the reference flow is maintained in proportion with the orifice area established by needle valve 46. The reference flow $Q_M$ through needle valve 46 being a small fraction of the maximum average flow $Q_A$, bypass valve 42 is normally open and passing most of the fluid leaving the tank. But for brief periods following peak flow demands, net flow Q from the tank could drop below $Q_M$ without dump valve action. Valve 44 is provided to prevent loss of the regulated pressure drop between chambers 86 and 88 during these periods.

If at any time the total flow Q from tank 16 should tend to be less than the flow $Q_M$ through the flow meter 40, the valve 44, which also senses the pressure drop between chambers 86 and 88, opens when said pressure drop falls only slightly below its preselected value for regulation by bypass valve 42. This increases the dumping of fluid through port 92 by opening chamber 88 to port 92 through passage 94, prevents excessive loss of metering head at needle valve 46, and insures maintenance of the reference flow through the reference flow meter 40.

To provide the desired reference flow schedule (such as curve $Q_M$ of FIGURE 2A), the flow meter 40 drives the needle valve 46 leftward through a gear reduction to reduce the reference flow as time passes. Note that by scheduling orifice area as a function of the quantity of fluid passed, the flow rate is scheduled as a preselected function of time. Thus, the contouring of tip 84 establishes the desired time schedule for curve 34.

Because the displacement of meter 40 is $k$ times the displacement of meter 36 and because the reference flow is scheduled to be $k$ times the flow called for by curve $Q_A$ termed the nominal maximum average injector flow, the matching of the movements of the valve 46 and the sleeve 78 assures that the total quantity of liquid removed from tank 16 corresponds to the area under curve $Q_A$ of FIGURE 2A up to the instant of time considered. Since the initial load of liquid corresponds to the total volume to be utilized for a burning time for a rocket or similar engine as found under the maximum average curve, it is seen that there remains a quantity sufficient to take care of the maximum average consumption for the remainder of the firing period. Any more fluid than this will be dumped, for example where one is supplying fuel or a thrust vectoring injectant.

In another embodiment of my invention, as seen in FIGURE 4, a scheduling valve is shown having a positive displacement hydraulic motor 96, such as a gear type flow meter, which motor passes all the liquid leaving a tank, such as tank 16 of FIGURE 1. The motor drives a cam 98 through a worm gear 100, a mating gear 102 for worm 100 and still another worm gear 104 that mates with teeth 106 carried by cam 98. The gear reduction provided by such means driving cam 98 is such that the angular position of the cam is thus a measure of the amount of fluid which has left the tank.

A cam follower is provided which is moved by cam 98 such that the translational position of follower 108 is a prescribed function of the volume of liquid expended. The cam follower is mounted to a tubular member 110 which is slidably mounted within another tubular member 112 and resiliently biased, as by spring 114, to extend outwardly of member 112 so that cam follower 108 is always in engagement with cam 98. The tubular member 112 is slidably mounted, as at 116, to the housing 118, and is provided with a radiating piston wall 120, which piston is operatively associated with the inner cylindrical surface 122 such that it is volumetric displacement responsive to create a variable volume chamber 124. In addition, the outer tubular member 112 is ported as at 126, and the inner tubular member 110 is ported, as at 128.

The housing 118 is provided with still another chamber 130 which, as is shown by FIGURE 4, is connected by a restrictive passage 132 to chamber 124. The chamber 130 is also one of variable volume due to the mounting of a bladder 134 therein, which bladder in some high temperature applications may be made of a metal and/or metallic material. The bladder 134 is provided with an inlet 136 which receives a pressurized fluid from a pressure source, such as a combustion chamber, which pressurized fluid acts to expand bladder 134. The chamber 130 is filled with any one of the several incompressible fluids available which means that expansion of the bladder forces the fluid to flow to chamber 124 and this moves piston 120 which causes leftward movement, as viewed in FIGURE 4, of member 112. The flow from chamber 130 to chamber 124 is preferably at a rate that is essentially proportional to the ratio of the pressure of the fluid entering bladder 134 to the viscosity of the fluid in chamber 130, and thus the displacement of the movable wall 120 is at a rate proportional to the flow rate into chamber 124.

As shown by FIGURE 4, the ports in the member 110 are positioned relative to the ports in member 112 such that leftward movement of member 112 or rightward movement of member 110 will overlap said ports, such that chamber 138 is in communication with chamber 140 through tubular member 110.

When the ports are overlapped, fluid is dumped through outlet 146 and the net fluid flow through inlet 142 is increased to increase the speed of rotation of motor 96 which moves cam 98 counterclockwise which moves member 110 leftwardly. Thus, the valve action formed by the coaction of the ports 126 and 128 results in movement of cam 98 such that follower 108 can get ahead of, but cannot lag significantly behind, the leftward movement of piston 120. It also is to be understood that with this design, I permit fluid to be bypassed from a normal outlet 144 to bypass or dump outlet 146 by way of ports 126 and 128.

With such a control as this, I may schedule the consumption of secondary injectant fluid essentially independent of the system demand for secondary injectant as above, or I may control the supply of fuel to a combustion chamber in accordance with the pressure developed therein merely by bleeding said pressure to said bladder. With such a system, however, as may be readily appreciated by those skilled in the art, the bladder would be constructed of metal foil or the like to take high temperature applications or the chamber 130 may be divided into two variable volume chambers by a movable wall or the like. In any case, my control means may be utilized in a wide variety of applications such as above mentioned, or others such as actuation systems where pressure control and/or volume control are desired.

When the control of FIGURE 4 is applied to a system such as presented by FIGURE 1, the action of the motor 96 driving cam 98 permits the motion of cam follower 108 to follow a prescribed function of the weight of liquid passed, and thus to generate a synthetic time. I have also ascertained that the position of piston 120 is essentially a measure of actual time. Thus, if the consumption of the injection system is always less than that prescribed by curve 32 of FIGURE 2, the control would be continuously bypassing fluid. That is, cam follower 108 would move to the left with piston 120, and the ports 126 and 128 would be overlapped enough to bypass excess liquid as needed to achieve this. If the fluid consumption temporarily exceeds the flow scheduled by curve 32, the cam follower will move further to the left ahead of piston 120 and bypassing will stop until the subsequent period of reduced flow balances the period of excess flow, and when bypassing again resumes, the quantity passed will again be held at least equal to the time function as scheduled by curve $Q_A$ of FIGURE 2A.

I have also found that my last mentioned device may take many forms or variations, some of which are seen in FIGURES 5 and 6. In the case of the arrangement of FIGURE 5, the incompressible fluid is contained in chamber 148 formed to the left of the movable wall 120a. The mass of wall 120a is increased so as to exert a significant force in response to acceleration, which acceleration may be applied to the surrounding structure and may be, as in the case of FIGURE 1, the result of rocket lift-off or stage separation. A spring loaded latch member 150 holds the piston 120a at its right-ward extreme until such acceleration attains a preselected value and overcomes the spring 152 to release latch 150 and force piston 120a to the left to force fluid from chamber 148 through the restricted port 151. With this arrangement, no bladder is required, but the control action is now dependent on the consistency of vehicle mass ratio. If the control were to be applied to structures where all accelerations not attributable to the immediate surrounding structure were to have no effect on the control; e.g. in an upper stage of a rocket; a lock-out can be included comprising a spring biased probe 154, which probe can be removed from an indentation in piston 120a by a pressure source through passageway 156. The pressure source may be tied in with a pressure fluid from explosive bolts between stages or a pressure bleed to a secondary rocket engine.

As for the timing arrangement of FIGURE 6, the tubular member 112a is actuated by a screw 158 rotated by a motor 160 through a gear reduction means 162 mounted to and within an extension 118a of casing 118. The tubular member is guided and restrained from rotating by a pin 164 that traverses a slot between slides 166 (one of which is shown). The motor 160 is a constant speed motor which is controlled by a governor—except that if A.C. electric power is the source driving said motor, a synchronous motor would be used and no governor would be needed as in the case of a fluid and/or D.C. motor.

Although certain embodiments of this invention have been illustrated and described herein, it will be evident that various changes and modifications may be made in the construction and arrangement without departing from the novel scope of this concept.

I claim:

1. In a gaseous jet engine having a nozzle, a means for controlling a flow of vectoring fluid being injected in said nozzle, said control means comprising:
   a first means responsive to a flow of a fluid;
   a second means responsive to a reference flow for the fluid;
   a third means to correlate said first and second means; and
   a bypass means to dump said fluid when the flow of said fluid is less than prescribed by the reference flow means.

2. A control means according to claim 1 wherein said first means includes a gear-type flow meter.

3. A control means according to claim 2 wherein said second means includes a gear-type flow meter.

4. A control means according to claim 3 wherein said third means includes a pair of concentric sleeves driven by respective flow meters.

5. A control means according to claim 4 wherein said bypass means includes passagesways in said concentric sleeves which are overlapped when one of said sleeves lags behind the other in angular position whereupon a portion of the fluid that has passed through said second flow responsive means is ported from the control means to accelerate the lagging sleeves and maintain synchronous speed of said sleeves and the desired flow through said control means.

6. A control means according to claim 2 wherein said second means responsive to a reference flow for the fluid includes a volumetric displacement responsive means subject to the reference flow of fluid into a chamber.

7. A control means in accordance with claim 6 wherein said bypass means includes:
   a cam gear driven by said gear-type flow meter;
   a cam follower operatively associated with said cam and connected with a tubular member having at least one port in the walls of said member; and another tubular member concentric with the tubular member of said cam follower and having at least one port in the walls thereof, said other tubular member being operatively associated with said volumetric displacement responsive means.

8. A control means in accordance with claim 1 wherein said second means responsive to a reference flow for the fluid includes:

a cylinder;

a movable wall slidably mounted in said cylinder and dividing said cylinder into at least one variable volume chamber, said movable wall having a tubular projection with a passageway in the walls thereof slidably mounted in said control means;

a cam driven by said first means responsive to the flow of the fluid;

a cam follower operatively associated with said cam, said follower having a tubular portion with a passageway in the walls thereof; and means to concentrically mount the cam follower tubular portion and the movable wall tubular portion so that one of said tubular portions may move with respect to the other.

9. A control means in accordance with claim 8 wherein said movable wall is controlled by a link with a pressure responsive means subject to a pressure in a chamber to which said fluid is applied.

10. A control means in accordance with claim 9 wherein said link is a hydraulic link having a restrictive flow controlling means.

11. A control means in accordance with claim 8 wherein said movable member is a dense mass subject to acceleration forces and is mounted within a cylinder such that it divides said cylinder into two variable volume chambers one of which is subjected to ambient pressure and the other of which contains an incompressible medium, which cylinder is restrictively ported to control movement of said movable member by controlling the exhausting of said incompressible fluid.

12. A control means according to claim 11 but further comprising a latching means which releases said movable member for motion in said cylinder upon the occurrence of acceleration forces above a preselected amount.

13. A control means in accordance with claim 1 wherein said second means responsive to future demands for the flow of the fluid includes:

a first tubular member movably mounted within said control means, said member having a passage through the wall thereof;

a second tubular member operatively associated with said first tubular member, said second tubular member having a passage in the wall thereof;

a means controlling said second tubular member; and a means for moving said first tubular member to align the passages of said first and said second tubular members.

14. A control means in accordance with claim 1 wherein said third means integrates said first and second means in accordance with:

$$Q_M = f(t) = KQ_A$$

$$\int_0^t (Q+Q_D)dt \geq \int_0^t \frac{Q_M}{K}dt = \int_0^t Q_A dt$$

where $Q$ = Flow demanded by the system;
$Q_A$ = Maximum average flow required at any one point of time for future use;
$Q_D$ = Dumped flow;
$Q_M$ = Preselected reference flow;
$f(t)$ = A preselected function of time; and
$K$ = An arbitrary constant for obtaining a reference flow that is less than a programmed typical flow.

15. A control means in accordance with claim 4 wherein said third means also comprises a movable needle valve which gradually closes off a flow, said needle valve being moved by said second means responsive to the future demand for the flow of a fluid.

16. In a gaseous jet engine having a nozzle, a means controlling a flow of a vectoring fluid being injected in said nozzle, said means comprising:

a supply means for said fluid;

a total flow measuring means determining the total flow of said fluid from said supply means;

a means to divert a portion of said total flow in acordance to a preselected schedule of future demands on said flow of said fluid;

a reference flow measuring means for measuring said diverted flow, said reference flow measuring means controlling the means diverting said portion of said total flow;

a pair of concentric sleeves driven respectively by said total flow measuring means and said reference flow measuring means, said sleeves being slotted to act as valves to control the flow of fluid from said reference flow measuring means with said valve action being attributed to the speed of rotation of said sleeve;

a first spring loaded valve means for controlling the flow not diverted through said reference flow measuring system; and a second spring loaded valve controlled by reference and total flow pressure to open and bypass reference flow whenever said reference flow pressure is greater than said total flow pressure.

17. In a gaseous jet engine having a nozzle, a means controlling a flow of a vectoring fluid being injected in said nozzle, said means comprising:

a supply means for said fluid;

a flow measuring means determining the total flow of said fluid from said supply means;

a pressure responsive means sensing pressure within said gaseous jet engine;

a volumetric displacement responsive means;

a hydraulic link connecting said pressure responsive means and said volumetric displacement responsive means;

a telescoping link means operatively interposed with said second pressure responsive means and said flow measuring means; and a valve means controlled by said telescoping link means to bypass fluid not needed in said gaseous jet engine.

18. A method of controlling an injection vectoring fluid to a gaseous jet engine nozzle in accordance with a future need therefor comprising the steps of:

sensing the total flow of a fluid;

variably diverting a portion of said fluid;

measuring the portion diverted while simultaneously monitoring the amount to be diverted; and integrating the flow through said sensing and measuring means to obtain a flow in accordance with the equations:

$$Q_M = f(t) = KQ_A$$

$$\int_0^t (Q+Q_D)dt \geq \int_0^t \frac{Q_M}{K}dt = \int_0^t Q_A dt$$

where $Q$ = Flow demanded by the system;
$Q_A$ = A maximum average flow to be utilized over a remaining time span;
$Q_D$ = Dumped flow;
$Q_M$ = A preselected reference flow;
$f(t)$ = A preselected function of time; and
$K$ = A fixed fraction of the flow $Q_A$ which is equal to the difference in displacement of the sensing flow means and measuring means for the diverted flow.

References Cited by the Examiner

UNITED STATES PATENTS

| | | | |
|---|---|---|---|
| 1,920,294 | 8/1933 | Dougherty | 73—261 |
| 2,079,083 | 5/1937 | Montelius | 73—261 |
| 2,604,756 | 7/1952 | Greenland | 60—39.28 |
| 2,657,527 | 11/1953 | Muller et al. | 60—39.28 X |

MARK NEWMAN, *Primary Examiner.*

SAMUEL LEVINE, *Examiner.*

W. A. SCHUETZ, *Assistant Examiner.*